United States Patent
Kim

(10) Patent No.: US 10,469,734 B2
(45) Date of Patent: *Nov. 5, 2019

(54) CAMERA ADJUSTING FOCUS USING ROTATING METHOD AND OBJECT PROCESSING APPARATUS USING THE SAME

(71) Applicant: Gachisoft Inc., Daejeon, Yuseong-gu (KR)

(72) Inventor: Hoyon Kim, Sejong (KR)

(73) Assignee: Gachisoft Inc., Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/928,740

(22) Filed: Mar. 22, 2018

(65) Prior Publication Data
US 2018/0324349 A1 Nov. 8, 2018

(30) Foreign Application Priority Data
Jan. 23, 2017 (KR) .......................... 10-2017-0010544

(51) Int. Cl.
*H04N 5/232* (2006.01)
*G03B 15/16* (2006.01)
(Continued)

(52) U.S. Cl.
CPC ........... *H04N 5/23212* (2013.01); *G03B 3/10* (2013.01); *G03B 13/36* (2013.01); *G03B 15/16* (2013.01); *G03B 17/17* (2013.01); *G06K 7/10722* (2013.01); *G06K 7/1413* (2013.01); *G06K 9/00469* (2013.01); *G06K 9/209* (2013.01);
(Continued)

(58) Field of Classification Search
CPC .... G03B 13/36; G03B 17/17; H04N 5/23212; G06K 7/1413
See application file for complete search history.

(56) References Cited

U.S. PATENT DOCUMENTS

| 6,233,014 B1* | 5/2001 | Ochi ........................ H04N 3/08 348/195 |
| 2004/0155976 A1* | 8/2004 | Suda ....................... G03B 13/36 348/345 |
| 2010/0006742 A1* | 1/2010 | Wurz ....................... H04N 1/04 250/206.1 |
| 2013/0311214 A1* | 11/2013 | Marti ..................... G06Q 10/02 705/5 |
| 2015/0378149 A1* | 12/2015 | Imaizumi ........... G02B 26/0816 359/221.2 |

(Continued)

FOREIGN PATENT DOCUMENTS

JP 63-131660 A 6/1988
JP 5-14903 U 2/1993
(Continued)

OTHER PUBLICATIONS

Korean Office Action dated Aug. 10, 2018, in corresponding Korean Application No. 10-2017-0010544 (9 pages, in Korean).
(Continued)

*Primary Examiner* — Mainul Hasan
(74) *Attorney, Agent, or Firm* — NSIP Law

(57) ABSTRACT

A camera configured to adjust a focus thereof on the basis of a rotating method and an object processing apparatus using the same are provided. The camera according to one embodiment moves a mirror between a lens and a sensor forward and backward, moves one side end of the sensor without a mirror, or moves the sensor forward and backward using rotation of a cam connected to a rotating motor to adjust a focal length between the lens and the sensor and adjust a focus of the camera onto a moving object.

10 Claims, 15 Drawing Sheets

(51) Int. Cl.
  *G03B 17/17*  (2006.01)
  *G03B 13/36*  (2006.01)
  *G06K 7/10*  (2006.01)
  *G06K 7/14*  (2006.01)
  *G06K 9/20*  (2006.01)
  *G06K 9/00*  (2006.01)
  *G03B 3/10*  (2006.01)
  *B07C 5/342*  (2006.01)

(52) U.S. Cl.
  CPC ....... *G06K 9/2063* (2013.01); *H04N 5/23229* (2013.01); *B07C 5/3422* (2013.01); *G06K 2209/01* (2013.01)

(56) References Cited

U.S. PATENT DOCUMENTS

2018/0173987 A1    6/2018    Kim

FOREIGN PATENT DOCUMENTS

| KR | 10-2009-0029924 A | 3/2009 |
| KR | 10-2016-0146405 A | 12/2016 |

OTHER PUBLICATIONS

Korean Office Action dated Apr. 15, 2019, in corresponding Korean Application No. 10-2017-0010544 (9 pages in Korean).

* cited by examiner

CAMERA ADJUSTING FOCUS USING ROTATING METHOD AND OBJECT PROCESSING APPARATUS USING THE SAME

CROSS-REFERENCE TO RELATED APPLICATION

This application claims priority to and the benefit of Korean Patent Application No. 10-2017-0010544, filed on Jan. 23, 2017, the disclosure of which is incorporated herein by reference in its entirety.

BACKGROUND

1. Field of the Invention

The present invention relates to a camera technology for photographing a quickly moving object.

2. Discussion of Related Art

Line scan cameras or area scan cameras are used to photograph moving objects. For example, to photograph a moving object on a moving base such as a conveyer belt, the line scan camera or the area scan camera acquires image data by emitting light toward the object and detecting light reflected from the object.

Image acquisition technologies using line scan cameras or area scan cameras may be applied to logistics, factory automation (FA), and inspection process automation according to uses, and may have various application fields such as recognition of a position, a size, and a shape of an object, an identification mark or text, a defect inspection, and the like. However, a camera needs a high speed focus control capability in order to acquire a high quality image even when an object rapidly moves.

SUMMARY OF THE INVENTION

The present invention is directed to providing a camera capable of corresponding to a speed of a rapidly moving object and simply automatically adjusting a focus to acquire an image of the object, and an object processing apparatus using the same According to an aspect of the present invention, there is provided a camera including a lens configured to collect and transmit light received from a moving object, a mirror configured to reflect the light transmitted via the lens, a sensor configured to receive the light reflected by the mirror and convert the light into an image signal, a cam configured to move the mirror forward and backward using a rotational motion thereof and adjust a focal length between the lens and the sensor to adjust a focus of the camera, and a rotating motor configured to drive the cam.

The sensor may include a line sensor having a line-shaped sensing area, and the camera may include a line scan camera.

The rotating motor may rotate the cam such that the mirror performs a translational motion along an outline of the rotating cam to adjust the focal length between the lens and the sensor.

The cam may have a shape provided to control the mirror to move at a constant angular velocity of the rotating motor and adjust the focal length between the lens and the sensor when a distance from the camera to a surface of the object to be photographed is linearly increased or decreased. The cam may have an incremental value which is determined such that a distance from the camera to a surface to be photographed when a focus of the camera is adjusted is linearly changed by an incremental value of a distance by which the mirror is pushed or pulled using the rotating cam and an elastic member. The cam may have a line-symmetrical heart shape or a cross-symmetrical oval shape.

The mirror may have one side end fixed by a mirror shaft and the other side end connected to the cam, and the other side end of the mirror may be moved about the mirror shaft by the cam connected to the rotating motor. The mirror may include a first mirror configured to reflect the light transmitted via the lens and a second mirror configured to reflect the light reflected by the first mirror and transmit the light to the sensor, and the first mirror and the second mirror may be movable.

The camera may further include a joint configured to connect one side end of the mirror with a mirror shaft or connect the other side end of the mirror with the cam, and the mirror may move about the joint configured to serve as a rotating shaft 10. The camera may further include an elastic member configured to prevent the mirror from shaking or escaping from a rotating shaft.

According to another aspect of the present invention, there is provided a camera including a lens configured to collect and transmit light received from a moving object, a sensor configured to convert the light transmitted via the lens into an image signal, a cam configured to move the sensor forward and backward using a rotational motion thereof and adjust a focal length between the lens and the sensor to adjust a focus of the camera, and a rotating motor configured to drive the cam.

According to still another aspect of the present invention, there is provided a camera including a lens configured to collect and transmit light received from a moving object, a sensor configured to convert the light transmitted via the lens into an image signal, a cam configured to move the sensor using a rotational motion thereof and adjust a focal length between the lens and the sensor to adjust a focus of the camera, and a rotating motor configured to drive the cam, wherein the sensor has one side end fixed by a sensor shaft, and the other side end is moved about the fixed one side end by the cam.

The cam may have a shape provided to control the sensor to move according to a constant angular velocity of the rotating motor and adjust the focal length between the lens and the sensor when a distance from the camera to a surface of the object to be photographed is linearly increased or decreased. The cam may have an incremental value which is determined such that a distance from the camera to the surface to be photographed when a focus of the camera is adjusted is linearly changed by an incremental value of a distance by which the sensor is pushed or pulled using the rotating cam or an elastic member.

According to yet another aspect of the present invention, there is provided an object processing apparatus including a camera configured to adjust a focal length between a lens and a sensor for a moving object by moving a mirror between the lens and the sensor forward and backward, moving one side end of the sensor without a mirror, or moving the sensor forward and backward using a rotational motion of a cam connected to a rotating motor, a measuring unit configured to measure a size or position of the object or a distance to the object, and a controller configured to drive the rotating motor on the basis of information measured by the measuring unit.

The camera may include the lens configured to collect and transmit light received from the moving object, the mirror configured to reflect the light transmitted via the lens, the sensor configured to receive the light reflected by the mirror and convert the light into an image signal, the cam configured to move the mirror forward and backward using a rotational motion and adjust the focal length between the lens and the sensor, and the rotating motor configured to drive the cam.

The camera may include the lens configured to collect and transmit light received from the moving object, the sensor configured to convert the light transmitted via the lens into an image signal, the cam configured to move the sensor forward and backward using a rotational motion and adjust the focal length between the lens and the sensor, and the rotating motor configured to drive the cam.

The camera may include the sensor configured to convert light transmitted via the lens into an image signal, the cam configured to move the sensor using a rotational motion thereof and adjust the focal length between the lens and the sensor to adjust a focus of the camera, and the rotating motor configured to drive the cam, wherein the sensor may have one side end fixed by a sensor shaft, and the other side end may be moved about the fixed one side end by the cam.

The controller may calculate a movement value by which the mirror is moved between the lens and the sensor or the sensor is moved without a mirror from a size or position of the object or a distance from the object measured by the measuring unit such that a distance from the camera to a surface of the object to be photographed when a focus of the camera is adjusted is linearly changed, and transfer a control signal to the rotating motor to rotate the rotating motor according to a result of the calculation.

The camera may acquire an image as a barcode of the object or address information of the object.

The object processing apparatus may further include an identifying unit configured to read at least one among identification information, address information, and a destination code of the object expressed as a barcode or text from an image photographed by the camera. The object processing apparatus may further include a communicating unit configured to transmit and receive data to and from a managing server configured to manage object information and object classification information, wherein the communicating unit may transmit the at least one among the identification information, the address information, and the destination code of the object read from the acquired image by the identifying unit to the managing server and receives the object classification information matched with the information transmitted from the managing server, and the controller may classify the object using the received object classification information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. In the description of the present invention, when it is determined that detailed descriptions of related well-known functions unnecessarily obscure the gist of the present invention, the detailed descriptions will be omitted. In addition, some terms described below are defined in consideration of functions in the present invention, and meanings thereof may vary depending on, for example, a user or operator's intentions or customs. Therefore, the meanings of terms should be interpreted on the basis of the scope throughout this specification.

Figure 1:
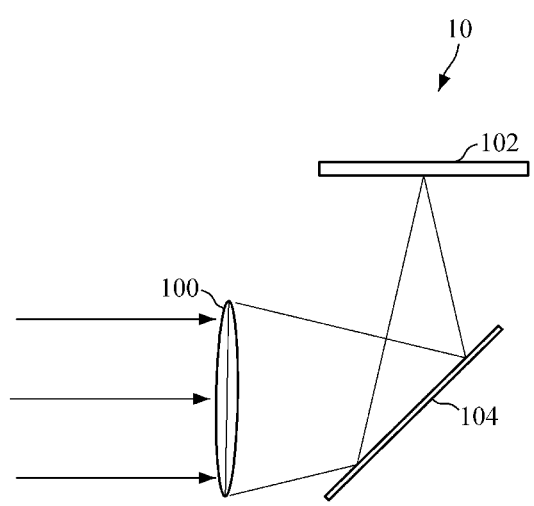
FIG. 1 is a configuration diagram illustrating a camera of which a focus is adjusted using a mirror according to one embodiment of the present invention.

FIG. 1 is a configuration diagram illustrating a camera of which a focus is adjusted using a mirror according to one embodiment of the present invention.

Referring to FIG. 1, a camera 10 includes a lens 100, a sensor 102, and a mirror 104.

The camera 10 photographs an object to acquire an image of the object. The object is a moving object, for example, an object moving on a moving base such as a conveyer belt. In a case in which the camera 10 is located at a fixed location, the camera 10 photographs objects being moved on the moving base. The objects may be rapidly moving objects, for example, objects moving at a speed of 1 to 4 meters per second. In addition, sizes such as heights or volumes of the objects may be different. In this case, distances from surfaces of the objects to be photographed to the camera 10 are different for each of the objects. Accordingly, the camera 10 rapidly adjusts a focus thereof according to the distances from the objects to the camera 10 according to the heights or volumes of the objects when photographing the objects having different heights or volumes. The surface to be photographed by the camera 10 may be an upper surface, a left surface, a right surface, a front surface, or a rear surface of the object. For another example, since an object moves, a distance from the surface of the same object to be photographed to the camera 10 may be changed. When the camera 10 photographs a side surface of the object and the object moves at a constant speed, a distance from the camera 10 to the surface of the object to be photographed is linearly increased or decreased. Accordingly, a focus has to be adjusted according to the movement of the object.

The lens 100 included in the camera 10 collects light incident from the object and transmits the light to the mirror. The sensor 102 converts the light received via the lens 100 into an image signal to acquire an image. The sensor 102 is located at a location at which the light transmitted via the lens 100 is collected, and an image may be acquired by the sensor 102.

The mirror 104 is located between the lens 100 and the sensor 102, reflects the light transmitted from the lens 100, and transmits the reflected light to the sensor 102. Here, the mirror 104 located between the lens 100 and the sensor 102 means that the mirror 104 is located on an optical path between the lens 100 and the sensor 102 through which light physically passes. A focal length of the camera means a distance from the lens 100 to the sensor 102.

In the camera 10 according to one embodiment, the lens 100 and the sensor 102 are installed at fixed locations, and the mirror 104 is installed to be movable between the lens 100 and the sensor 102 such that a focal length from the lens 100 to the sensor 102 is increased or decreased. The mirror 104 is moved to increase or decrease the focal distance from the lens 100 to the sensor 102 so as to adjust a focus of the camera 10 according to the distance from a surface of the object to be photographed to the camera 10, wherein the distance is changed according a height or volume of the object.

Since the lens 100 is heavy, when the focus is adjusted by rotating the lens 100, a physical defect, such as wear, may occur, and particularly, such rotation is not suitable when rapidly adjusting the focus. In the case of the sensor 102, since a cable for transmitting a signal is connected to the sensor 102, it is not easy to move the sensor 102 to adjust the focus. Accordingly, in the camera 10 according to one embodiment, the focus of the camera 10 is easily adjusted by fixing the lens 100 and the sensor 102 and moving the mirror 104 installed to be movable between the lens 100 and the sensor 102. Particularly, the camera 10 adequately adjusts its focus on a rapidly moving object.

The camera 10 according to one embodiment is a line scan camera. Although the line scan camera may either be a contact type line scan camera or a non-contact type line scan camera such as a long or short distance scanner, the camera 10 of FIG. 1 is the non-contact type line scan camera. The sensor 102 of the line scan camera is a line sensor having a long line-shaped sensing area. The line scan camera linearly scans an object using the line sensor.

In a case in which an area scan camera uses a two or more dimensional area sensor, a location of the sensor also has to be changed to adjust the focus. For example, the sensor has to be inclined at a predetermined angle together with the mirror. In this case, an upper or lower area of a sensing area except the sensing area of a center of the sensor is out of focus. However, in the case of the line sensor having either longitudinal or transversely long line shapes, since only the sensing area having a line shape is meaningful, adjusting a focus on an area which is not the sensing area is unnecessary. Accordingly, it is preferable for the camera 10 to be the line scan camera to adjust a focus using movement of the mirror 104. However, when a plurality of mirrors are used in the camera 10, the camera may be the area scan camera as well as the line scan camera, and an example related to a camera using the area scan camera will be described below with reference to FIG. 4.

Figure 2:
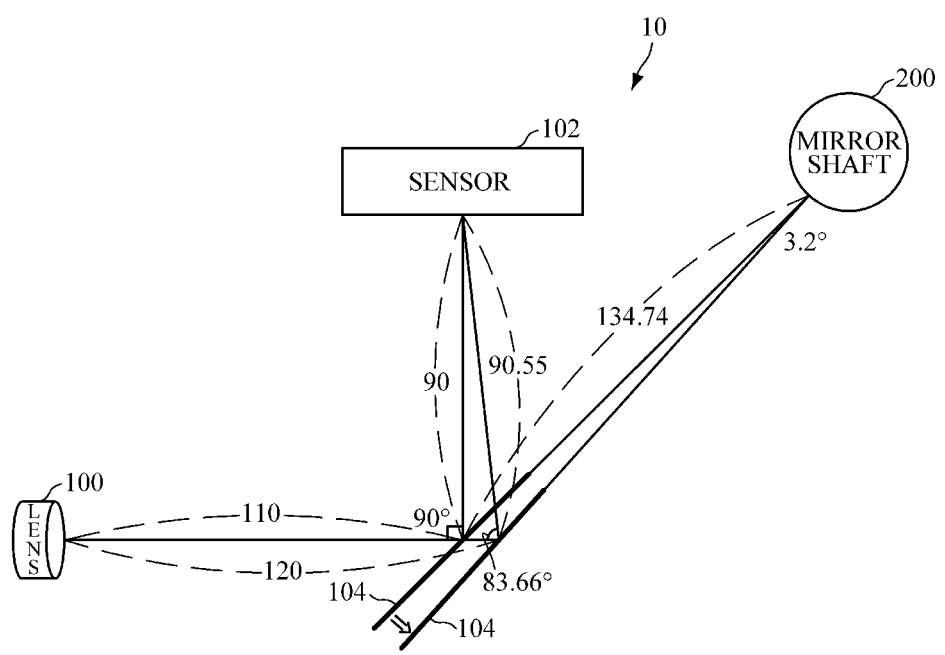
FIG. 2 is a reference view illustrating an example in which a focus of the camera is adjusted by moving the mirror according to one embodiment of the present invention.

FIG. 2 is a reference view illustrating an example in which a focus of the camera is adjusted by moving the mirror according to one embodiment of the present invention mirror.

Referring to FIG. 2, in a state in which one side end of the mirror 104 is fixed by a mirror shaft 200, the camera 10 adjusts its focus by moving the other side end of the mirror 104 forward and backward about the mirror shaft 200. Both of the side ends of the mirror 104 include extension lines. For example, as illustrated in FIG. 2, the one side end of the mirror 104 is a point at which the extension line of the mirror 104 meets the mirror shaft 200. A location of the mirror shaft 200 may be a point at which a position of an object varies minimally when the mirror 104 is assumed to be moved from both of the side ends of the mirror 104.

The mirror 104 according to one embodiment adjusts the focus of the camera 10 by adjusting an optical distance from the lens 100 to the sensor 102. For example, when upper surfaces of objects are photographed, the mirror 104 adjusts the focus according to heights of the objects. Here, in a case in which a height of an object is increased, the sensor 102 may be moved backward to adjust the focus, but, since the sensor 102 is fixed, the mirror 104 is moved backward to increase a focal length and adjust the focus. Conversely, in a case in which a height of an object is decreased, the mirror 104 is moved forward to decrease the focal length and adjust the focus.

For example, as illustrated in FIG. 2, when the focus is adjusted on a predetermined object, it is assumed that a distance from the lens 100 to the mirror 104 is 110 and a distance from the mirror 104 to the sensor 102 is 90. When, after the focus is adjusted and the object is photographed, a subsequent object is photographed and a height of the object is higher than that of the previous object, the mirror 104 is moved backward such that the distance from the lens 100 to mirror 104 and the distance from mirror 104 to the sensor 102 are increased to be 120 and 90.55, respectively, and thus a focus is adjusted. Here, an optical angle between the lens 100 and the sensor 102 is decreased from 90° to 83.66°.

For another example, in a case in which the camera 10 photographs a side surface of an object and the object is moved at a constant speed along the moving base, a distance from the camera 10 to the object is linearly increased or decreased. Here, the camera 10 controls a focal length between the lens 100 and the sensor 102 to be increased or decreased at the same speed to adjust the focus. The mirror 104 may be moved by a rotational motion of a cam. The cam is a plate-shaped apparatus having an outline for a rotational motion, and the mirror 104 may move forward and backward due to a rotational motion of the cam. The cam may be driven by rotation of the rotating motor. When the cam is installed at the rotating motor and driven, the rotational motion of the cam is converted into a forward and backward translational motion of the mirror 104. A structure of the camera including the cam and the rotating motor will be described below with reference to FIG. 5.

Figure 3:
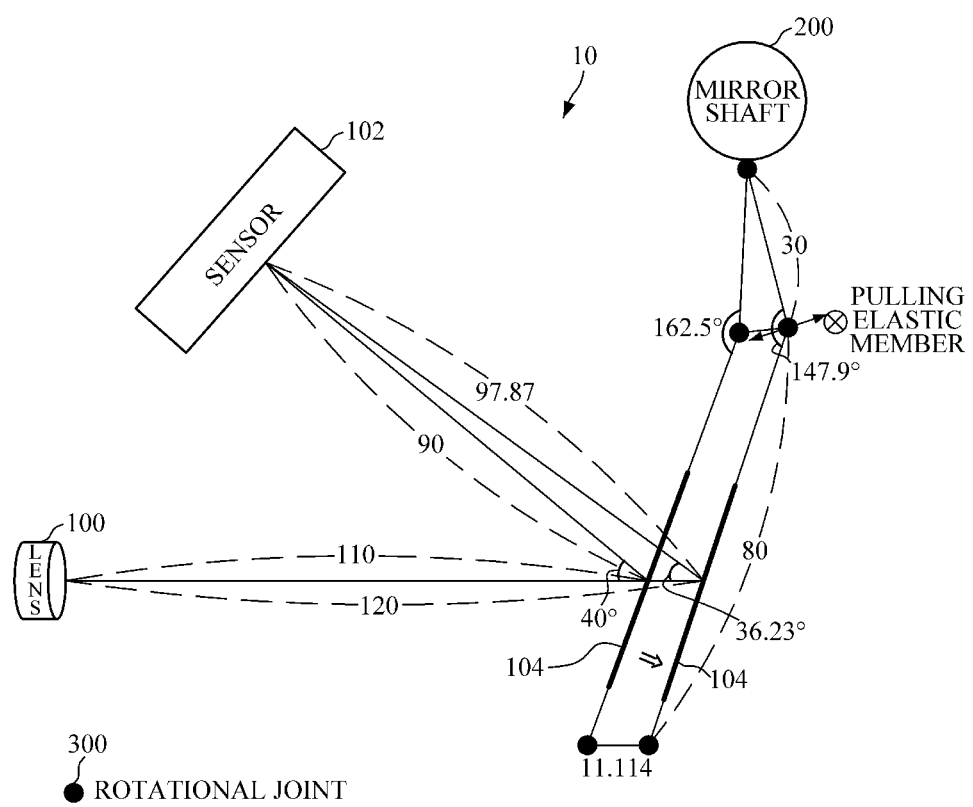
FIG. 3 is a reference view illustrating an example in which a focus of a camera is adjusted using a joint in a case in which a mirror shaft is located far from a mirror according to one embodiment of the present invention.

FIG. 3 is a reference view illustrating an example in which a focus of a camera is adjusted using a joint in a case in which a mirror shaft is located far from a mirror according to one embodiment of the present invention.

Figure 5:
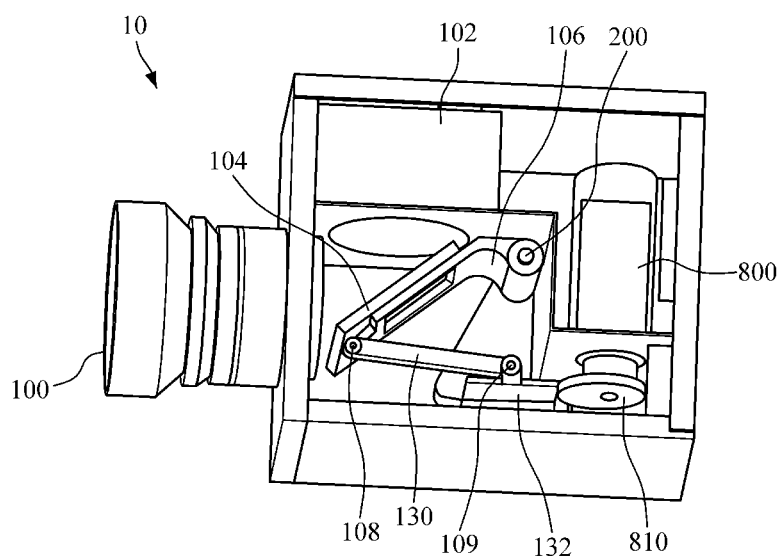
FIG. 5 is a three-dimensional view illustrating a camera according to one embodiment of the present invention.

Referring to FIG. 3, in a case in which the mirror shaft 200 is located far away from the mirror, joints 300 are used. For example, as illustrated in FIG. 3, the joint 300 may be located between the mirror shaft 200 and one side end of the mirror 104, or between the other side end of the mirror 104 and the cam configured to move the mirror 104. An upper portion of the mirror 104 is rotated about the joint 300 and a lower portion of the mirror 104 is connected to the cam and performs a forward and backward translational motion. As illustrated in FIG. 2, in the case in which only one joint is used above the mirror 104, a joint 108 may be additionally disposed below the mirror 104 for a rotational motion of the cam, as illustrated in FIG. 5.

The camera 10 according to one embodiment includes an elastic member configured to prevent the mirror 104 from shaking or escaping from a rotating shaft. The elastic member has a restoring force like, for example, a spring. For example, when the elastic member is provided between the lens 100 and one surface of the mirror 104 and the mirror 104 is constantly pulled toward or away from the lens 100 by the elastic member, an error due to the mirror 104 being shaken or escaping from the rotating shaft may be prevented. The elastic member prevents the mirror 104 from shaking or escaping from the rotating shaft by pulling or pushing the mirror 104 in any one direction. Therefore, control accuracy of a focal length of the camera 10 can be improved.

Meanwhile, since a principle of adjusting the focus of the camera 10 described with reference to FIG. 3 is the same as the principle of adjusting the focus by adjusting the focal length between the lens 100 and the sensor 102 using the mirror 104 described above with reference to FIG. 2, a detailed description of the principle with reference to FIG. 3 will be omitted.

Figure 4:
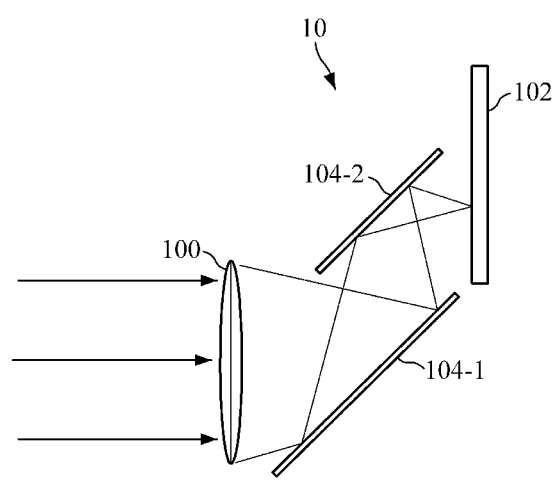
FIG. 4 is a configuration diagram illustrating a camera of which a focus is adjusted using a plurality of mirrors according to one embodiment of the present invention.

FIG. 4 is a configuration diagram illustrating a camera of which a focus is adjusted using a plurality of mirrors according to one embodiment of the present invention.

Referring to FIG. 4, a plurality of moving mirrors may be provided. For example, the moving mirrors may include two mirrors which are a first mirror 104-1 and a second mirror 104-2, as illustrated in FIG. 4. The first mirror 104-1 reflects light transmitted via the lens 100. In addition, the second mirror 104-2 reflects the light reflected by the first mirror 104-1 and transmits the reflected light to the sensor 102. Here, the first mirror 104-1 and the second mirror 104-2 move to adjust a focus of a camera 10. The first mirror 104-1 and the second mirror 104-2 may be moved simultaneously.

When the plurality of mirrors are used, the camera 10 may also adjust its focus in a case in which the camera is an area scan camera using an area sensor as well as a case in which the camera is a line scan camera using a line sensor. For example, as illustrated in FIG. 4, when light is reflected by the first mirror 104-1 and reaches the second mirror 104-2, the second mirror 104-2 transmits the reflected light to the sensor 102, unlike the first mirror 104-1. When the second mirror 104-2 is used, since light is perpendicularly (90°) incident onto the sensor 102, the area scan camera in addition to the line scan camera can also be used.

Figure 6:
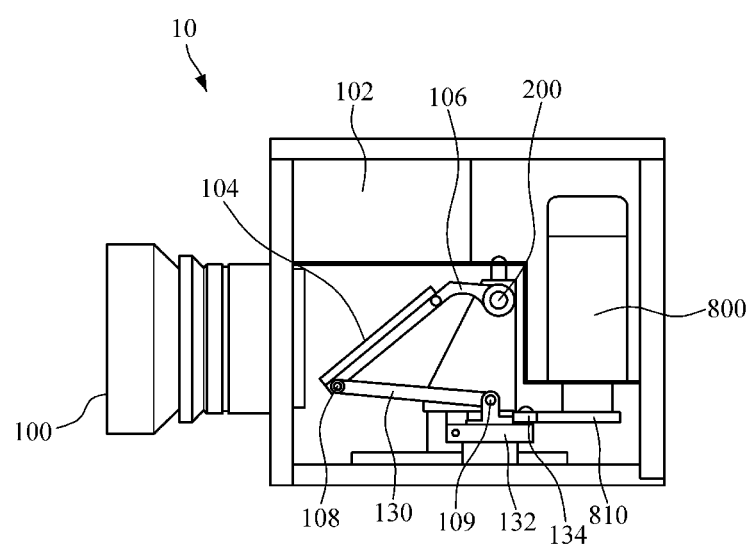
FIG. 6 is a front view illustrating the camera according to one embodiment of the present invention.

FIG. 5 is a three-dimensional view illustrating a camera according to one embodiment of the present invention, and FIG. 6 is a front view illustrating the camera according to one embodiment of the present invention.

Referring to FIGS. 5 and 6, a camera 10 includes a lens 100, a sensor 102, a mirror 104, a rotating motor 800, and a cam 810. The mirror 104 is supported by a mirror support 106 and has an extension line. One side end of the mirror 104 is fixed by a mirror shaft 200, and the opposite side end of the mirror 104 is physically connected to the cam 810. The cam 810 may be in direct contact with the mirror 104 or may be connected to the mirror 104 by connecting members 130, 132, and 134, as illustrated in FIGS. 5 and 6, and the connecting members 130, 132, and 134 may be formed in a rail form and serve to support the mirror 104 while connecting the cam 810 and the mirror 104. The cam 810 is rotated by the rotating motor 800, and the rotating motor 800 may be a step motor which performs a rotational motion. When the cam 810 is driven by the rotating motor 800, the cam 810 is rotated, and the opposite side end of the mirror 104 physically connected to the rotating cam 810 moves forward and backward about the mirror shaft 200. In a case in which the mirror shaft 200 is located far from the mirror 104, a joint for connecting the one side end of the mirror 104 and the mirror shaft 200 or connecting the other side end of the mirror 104 and the cam 810 may be provided. For example, as illustrated in FIG. 5, joints 108 and 109 may be provided between the mirror support 106 and the cam 810. Here, the joints 108 and 109 connect the mirror shaft 200 above the mirror 104 and the cam 810 connected to a lower portion of the mirror 104.

The camera according to one embodiment includes an elastic member configured to prevent the mirror 104 from shaking or escaping from the rotating shaft. When the elastic member having a restoring force like a spring is connected to the one side of the mirror 104 and the mirror 104 is pulled toward or away from the lens 100 by the elastic member, the mirror 104 may be prevented from being shaken. The elastic member may prevent the mirror 104 from being shaken by pulling or pushing the mirror 104 in any one direction. Therefore, accuracy of the camera can be improved. In addition, the elastic member serves to apply a restoring force needed by the mirror 104 pushed and moved by the cam 810 such that the mirror 104 returns to an original location according to rotating of the cam 810 in a state in which the mirror 104 is in contact with the cam 810.

Figure 7:
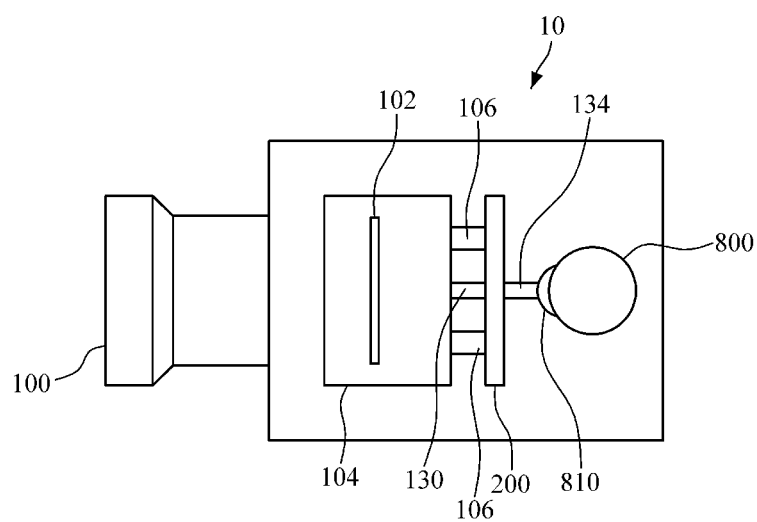
FIG. 7 is a plan view illustrating the camera according to one embodiment of the present invention.

FIG. 7 is a plan view illustrating the camera according to one embodiment of the present invention;

Referring to FIG. 7, in the camera 10, the cam 810 installed on the rotating motor 800 is rotated to move the mirror 104 connected to the cam 810 forward and backward. Such a rotating method has an advantage in that the camera 10 may be simply formed in comparison to a case of a linear type linear motor. One of the biggest advantages of the rotating method is that a location at which the camera 10 adjusts a focus is adjustable to be proportional to an angular velocity at which the rotating motor 800 rotates. An incremental value of a distance by which the cam 810 pushes or pulls the mirror 104 is determined by the angular velocity of the cam 810, and the incremental value of the cam 810 may be determined such that a distance from the camera 10 to a surface of an object to be photographed when a focal length between the lens 100 and the sensor 102 is adjusted is linearly changed by the incremental value of a distance by which the mirror 104 is pushed or pulled using the cam 810. Accordingly, the camera 10 can adjust the focus according to the focal length changed when an object is moved.

Here, an important point is whether the focal length is linearly controlled. When the mirror 104 is used, the focal length between the lens 100 and the sensor 102 is changed according to an inclination of the mirror 104. The focal length is not linearly changed when the rotating motor 800 rotates, and a range of change is changed by a location of the mirror shaft, a rod shaft configured to push the mirror, and the like. Accordingly, the focal length has to be controlled to be linearly changed according to movement of an object. One of the reasons that the focal length has to be linearly changed is that, in a case in which a side surface of a moving object is photographed using the camera 10, a focal length between the lens 100 and the sensor 102 is changed according to the movement of the object as described below with reference to FIGS. 13 and 14, and since a distance between the camera 10 and the surface of the object to be photographed is linearly increased or decreased, the focal length between the sensor 102 and the lens 100 has to be adjusted in real time to adjust a focus. Here, to use the proposed rotating method, a size of the cam 810 (an outer surface of the cam 810) is designed such that a location at which a focus is adjusted is linearly changed when a distance from the camera 10 to the surface of the object to be photographed is increased or decreased at a constant speed. Accordingly, while a side surface of one object is being photographed using the camera 10, the rotating motor 800 is simply rotated at a constant speed.

Figure 8:
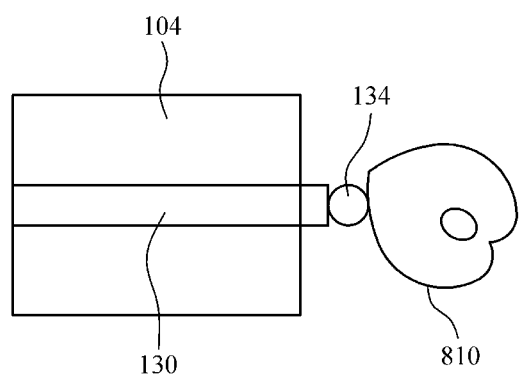
FIG. 8 is a plan view illustrating the mirror and a cam for describing movement of the mirror according to rotation of the cam according to one embodiment of the present invention.

FIG. 8 is a plan view illustrating the mirror and the cam for describing movement of the mirror according to rotation of the cam according to one embodiment of the present invention.

Referring to FIGS. 7 and 8, the cam 810 may have a line-symmetrical heart shape or a cross-symmetrical oval shape. A size of the cam 810 is designed in consideration of a distance by which the mirror 104 is pushed according to a rotational speed of the cam 810. The size of the cam 810 means a distance from a center of the cam 810 to an outer surface of the cam 810. The cam 810 may be designed such that, when a distance from the camera 10 to a surface of an object to be photographed is linearly increased or decreased, the cam 810 is rotated while an angular velocity of the rotating motor 800 is maintained, the mirror 104 is moved by rotation of the cam 810 so that the focal length between the lens 100 and the sensor 102 is adjusted.

As another example, as described below with reference to FIG. 9, in a case in which the sensor 102 is moved by a rotational motion of the cam 810 to adjust a focus of the camera without the mirror 104, when a distance from the camera 10 to a surface of an object to be photographed is linearly increased or decreased, the cam 810 has a shape provided to adjust a focal length between the lens 100 and the sensor 102 by moving the sensor 102 while an angular velocity of the rotating motor is constantly maintained. An incremental value of the cam 810 may be determined such that a distance from the camera 10 to a surface of an object to be photographed is linearly changed at a location at which a focus of the camera 10 is adjusted by an incremental value of a distance by which the cam 810 pushes or pulls the sensor 102.

Figure 9:
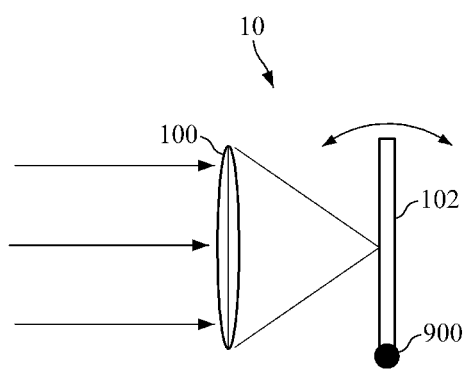
FIG. 9 is a configuration diagram illustrating a camera according to another embodiment of the present invention.

FIG. 9 is a configuration diagram illustrating a camera according to another embodiment of the present invention;

Referring to FIG. 9, a focus of a camera 10 may be adjusted even without using the mirror described with reference to FIG. 1. Here, a sensor 102 converts light transmitted via a lens 100 into an image signal, and the sensor 102, which is a follower, is moved forward and backward by a rotational motion of the cam to adjust a focal length between the lens 100 and the sensor 102 so that a focus of the camera 10 is adjusted. The cam is driven by the rotating motor.

One shaft of the sensor 102 may be fixed. A focus of the camera 10 may be adjusted by fixing one side end of the sensor 102, for example, a lower side end using a sensor shaft 900 and moving the opposite side end of the sensor 102 about the sensor shaft 900 as illustrated in FIG. 9. The opposite side end of the sensor 102 is connected to and moved by the cam, and the cam is connected to the rotating motor and driven by rotation of the rotating motor. In this case, a focus may be more easily adjust than a case in which an entirety of the sensor 102 is moved. In addition, a total volume of the camera 10 can be decreased.

Figure 10:
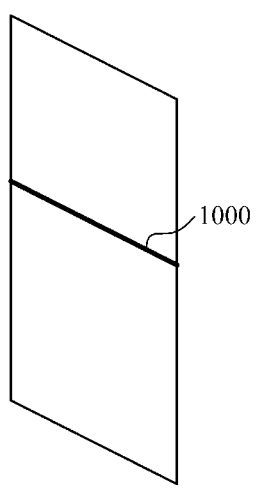
FIG. 10 is a reference view for describing a principle in which a focus of the camera may be adjusted by moving one side end of a sensor according to one embodiment of the present invention.

FIG. 10 is a reference view for describing a principle in which a focus of the camera may be adjusted by moving one side end of the sensor according to one embodiment of the present invention.

Referring to FIGS. 9 and 10, when a sensing area of the sensor 102 in FIG. 9 is a two-dimensional area, the sensing area is an area corresponding to reference number 1000, and the remaining area is not the sensing area. Even when one side of the sensor 102 is inclined with respect to the sensor shaft 900 to adjust a focus, the sensing area 1000 is located such that a focal length between the lens 100 and the sensor 102 is the same. Even when the focus is not adjusted onto the area which is not the sensing area 1000 because the focal length between the lens 100 and the sensor 102 is different from that of at the sensing area 1000, there is no problem in adjusting the focus, because the focus is adjusted onto the sensing area 1000 regardless of the area which is not the sensing area 1000.

Figure 11:
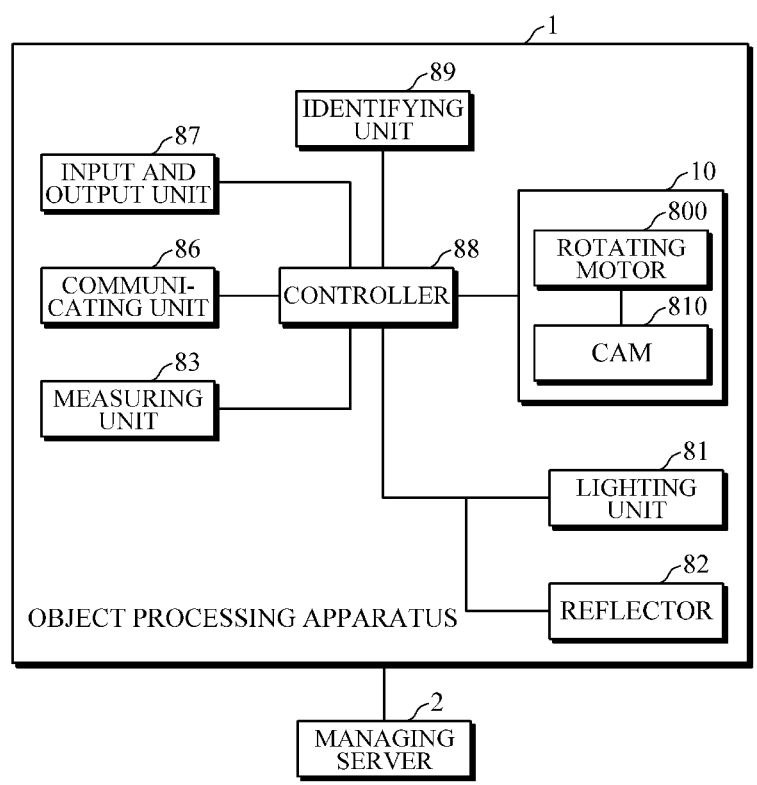
FIG. 11 is a configuration diagram illustrating an object processing system according to one embodiment of the present invention.

FIG. 11 is a configuration diagram illustrating an object processing system according to one embodiment of the present invention.

The technology of adjusting a focus of the camera, which is described above with reference to FIGS. 1 to 10, may be applied to the object processing system of FIG. 11. Here, a process includes registration, reception, classification, storage, inspection, and the like of an object. Hereinafter, an object classification technology will be mainly described, but an object processing is not limited to the object classification. The object may be an object which will be inspected or a piece of mail such as a parcel which will be transported or need a parcel service. Hereinafter, a case in which the object is a piece of mail will be mainly described, but the kind of object is not limited to being a piece of mail.

To facilitate understanding of the present invention, a mail classification process of the object processing system will be described below. First, when a piece of mail is received, a barcode, in which mail identification information (ID) is recorded, is printed on or attached to the piece of mail. The mail ID is a code including a series of numbers, such as an invoice number and a receipt number, uniquely assigned to the piece of mail for mail management when the piece of mail is received. The mail ID of the barcode may be stored in a managing server 2 and used as an identifier for tracing or referring to the piece of mail. In addition, sender information and recipient information received from a sender when the piece of mail is received are matched with object ID and stored in the managing server 2. The sender information and the recipient information include names, addresses, and zip codes.

Then, the object processing system automatically classifies pieces of mail according to recipients by moving the pieces of mail onto conveyer belts. For example, the barcode of the mail or address information is acquired as an image via a camera 10, and a piece of mail is automatically classified using acquired image data. The automatically classified piece of mail is transported to a corresponding recipient via a courier.

A process of automatically classifying a piece of mail using a barcode image will be described in more detail below. An object processing apparatus 1 reads ID of a piece of mail expressed in a photographed barcode image and transfers the read ID of the piece of mail to the managing server 2. The managing server 2 searches for address information of pieces of mail having the mail ID. The address information is information matched with the mail ID and stored in the managing server 2 in advance when the piece of mail is received, and includes a recipient address, a zip code, and the like. Since the managing server 2 stores mail classification information of the recipient address, for example, the recipient zip code, with which the piece of mail may be classified, the managing server 2 searches for the mail classification information matched with the recipient address and transfers the recipient address to the object processing apparatus 1. The object processing apparatus 1 receives the mail classification information and automatically classifies the piece of mail according to the mail classification information. For example, a piece of mail to be transported to Gwangju is classified and sent to a mail box number 1, and a piece of mail to be transported to Daejeon is classified and sent to a mail box number 2. Then, the classified pieces of mail are transported to corresponding regions via couriers.

Meanwhile, in a case in which the object processing apparatus 1 automatically classifies a piece of mail using a destination code and the like such as a recipient address photographed by the camera 10, a mail identification process performed when using a barcode is omitted. For example, the object processing apparatus 1 transfers a recipient address or a destination code photographed by the camera 10 to the managing server 2. The managing server 2 searches for mail classification information matched with the recipient address and transfers the mail classification information to the object processing apparatus 1. The object processing apparatus 1 receives the mail classification information and automatically classifies a piece of mail according to the mail classification information.

Hereinafter, a structure of the object processing apparatus 1 will be described in detail with reference to FIG. 11. Referring to FIG. 11, the object processing apparatus 1 includes the camera 10, a lighting unit 81, a reflector 82, a measuring unit 83, a communicating unit 86, an input and output unit 87, a controller 88, and an identifying unit 89, and the camera 10 includes the rotating motor 800 and the cam 810.

Moving objects may have different sizes such as heights and volumes, and positions thereof may be different according to movement thereof. Accordingly, it is necessary to adjust a focus of the camera 10 according to a change in the size and position of the object, or a distance to the object. Particularly, since the objects move quickly, the camera 10 has to quickly adjust its focus to correspond to the objects. Here, a focal length is controlled by moving the mirror or the sensor of the camera 10 using a rotational motion of the cam 810 installed at the rotating motor 800 to adjust the focus.

To adjust a focus, the camera 10 according to one embodiment includes the lens 100, the sensor 102, the mirror 104, the rotating motor 800, and the cam 810 as described above with reference to FIG. 1. The focus is adjusted onto an object by moving the mirror 104 between the lens 100 and the sensor 102 to adjust a focal length between the lens 100 and the sensor 102. Here, one side end of the mirror 104 is fixed by the mirror shaft, the other side end of the mirror 104 is connected to the cam 810 installed at the rotating motor 800, and the other side end of the mirror is moved forward and backward about the mirror shaft by the rotating motor 800 being driven.

The camera 10 according to another embodiment includes the lens 100, the sensor 102, the rotating motor 800, and the cam 810 without a mirror as described above with reference to FIG. 9, and a focus of the camera 10 is adjusted by moving the sensor 102 forward and backward using a rotational motion of the cam 810. As another example, one side end of the sensor 102 may be fixed, and the other side end thereof may be connected to the cam 810 installed at the rotating motor 800, and the other side end of the sensor 102 may be moved about the one side end of the sensor 102 by the rotating motor 800 to adjust a focus of the camera 10.

The lighting unit 81 emits light to an object using lighting. The reflector 82 reflects the light emitted by the lighting unit 81 onto the object. The lighting unit 81 may include a light emitting element such as a light emitting diode (LED) or a light bulb. The camera 10 receives light reflected by the object and photoelectrically converts the light to acquire an image of the object. There may be one or more cameras 10. In the case of the plurality of cameras, images of objects may be acquired at different positions.

The measuring unit 83 measures a size or position of the object before the camera 10 photographs the object. The size of the object includes a height or volume. The position is determined by a distance from the camera 10 to the object. The measuring unit 83 may be a contact type sensor configured to acquire a size or distance by coming into contact with the object. Alternatively, the measuring unit 83 may be an optical displacement sensor configured to acquire a size or distance of a corresponding object by emitting an optical signal to the object and using a signal reflected from the object. As another example, the measuring unit 83 may also be an image sensor configured to acquire a size or distance by acquiring an image of an object and using the acquired image. As necessary, the measuring unit 83 may measure a weight of an object as well as a size of the object.

The controller 88 controls an entirety of the object processing apparatus 1. The controller 88 processes an image photographed by the camera 10 and performs a physical control of each of the components. The controller 88 controls the input and output unit 87 through which a result of object processing may be output, and various matters may be set and commands may be input by a processor.

The controller 88 drives the rotating motor 800. To adjust a focus of the camera 10, in a case in which the mirror is used, the mirror connected to the cam 810 is moved by rotating the cam 810 using the rotating motor 800, and in a case in which the sensor is used, the sensor connected to the cam 810 is moved by rotating the cam 810 using the rotating motor 800.

The controller 88 according to one embodiment calculates a movement value by which the mirror is moved between the fixed lens and the fixed sensor from a size or position of an object or a distance from the object measured by the measuring unit 83 such that a distance from the camera 10 to a surface of the object to be photographed is linearly changed when a focus of the camera is adjusted, and transfers a control signal for moving the mirror to the rotating motor 800 according to a result of the calculation. As another example, in a case in which one side end of the sensor or the sensor is moved without a mirror, the controller 88 calculates a movement value by which the sensor is moved from a size or position of an object or a distance from the object measured by the measuring unit 83 such that a distance from a surface of the object to be photographed and the camera 10 is linearly changed when a focus of the camera is adjusted, and transfers a control signal for rotating the rotating motor 800 according to a result of the calculation. A function for controlling the rotating motor 800 to adjust a focus or a control function for acquiring an image may be included in the camera 10 or be included in another controller outside the camera 10.

The identifying unit 89 reads ID or address information of an object expressed as a barcode or text from an image photographed by the camera 10.

The communicating unit 86 allows data including an image photographed by the camera 10, an identification result read by the identifying unit 89, object information and object classification information stored in the managing server 2, and the like to be transmitted and received among the controller 88, the managing server 2, and the like. The communicating unit 86 according to one embodiment transfers the image photographed by the camera 10 to the identifying unit 89. The communicating unit 86 according to one embodiment transmits the ID or address information of the object acquired by the identifying unit 89 to the managing server 2 and acquires the object classification information from the managing server 2. Specifically, the communicating unit 86 transfers the ID or the address information of the object to the managing server 2. The managing server 2 searches for mail classification information matched with the address information. In a case in which the managing server 2 receives the ID of the object, the managing server 2 searches for the address information matched with the ID of the object and searches for the mail classification information matched with the address information. In addition, the managing server 2 transfers the found mail classification information to the object processing apparatus 1. Then, the communicating unit 86 receives the mail classification information from the managing server 2, and the controller 88 classifies the object according to the acquired mail classification information.

Figure 12:
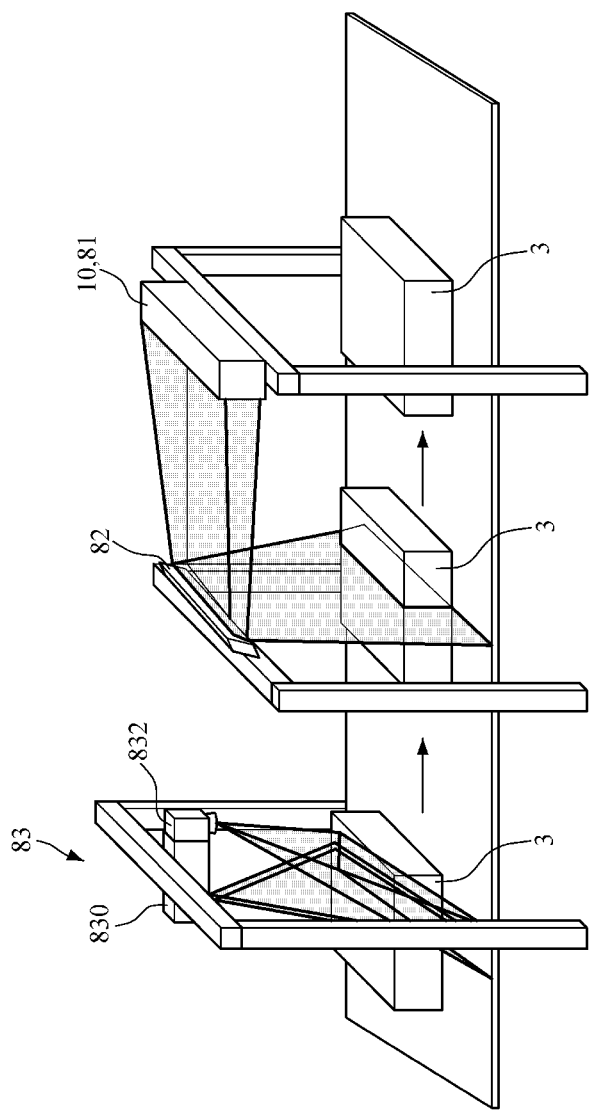
FIG. 12 is an exterior view illustrating the object processing apparatus according to one embodiment of the present invention.

FIG. 12 is an exterior view illustrating the object processing apparatus according to one embodiment of the present invention.

Referring to FIGS. 11 and 12, the measuring unit 83, the reflector 82, the camera 10, and the lighting unit 81 are sequentially installed on a moving base such as a conveyer belt, and objects 3 are rapidly moved between the measuring unit 83, the reflector 82, the camera 10, and the lighting unit 81 along a line. For example, as illustrated in FIG. 12, the objects 3 are moved rightward. The camera 10 and the lighting unit 81 may be located in the same space as illustrated in FIG. 12. The camera 10 may include the lens, the sensor, and the mirror. Alternatively, the camera 10 may include the lens and the sensor without a mirror. The camera 10 includes the cam configured to move the mirror or the sensor and the rotating motor configured to drive the cam. The camera 10 may also be installed in a transverse direction to photograph a side surface, a front surface, or a rear surface of each of the objects 3.

When the moving object 3 is positioned within a measurement coverage of the measuring unit 83, the measuring unit 83 measures a size including a height or volume or a position of the object 3 or a distance to the object 3. As illustrated in FIG. 12, the measuring unit 83 according to one embodiment includes a light source 830 configured to emit light such as a laser to the object 3 and a measurement camera unit 832 configured to receive a signal reflected by the object 3, convert the signal into an image, and measure the size or position of the object from the image. As necessary, the measuring unit 83 may also measure a weight of the object in addition to the size thereof. While the size or the position of the object or the distance to the object is measured, the object 3 is continuously moved, and a focus is adjusted onto the measured object 3 using the camera 10 to acquire an image such as a barcode or recipient information of the object 3. The acquired image is used to classify the object 3.

Figure 13:
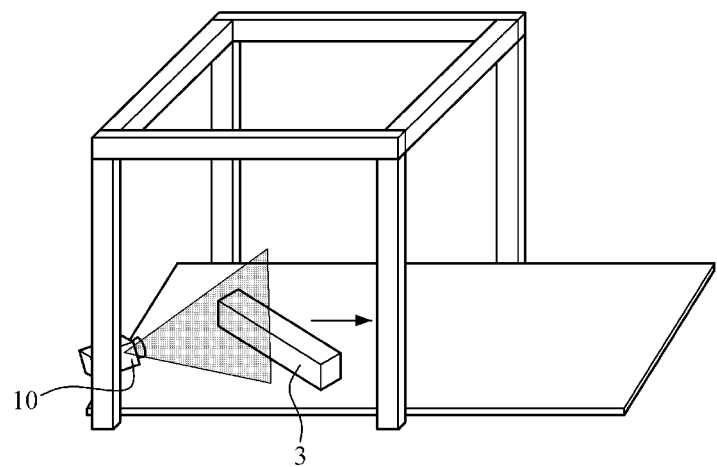
FIGS. 13 and 14 are reference views illustrating the camera according to one embodiment of the present invention when the camera photographs a side surface of an object.
Figure 14:
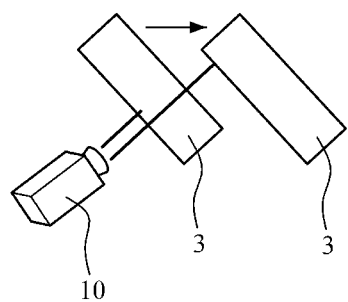

FIGS. 13 and 14 are reference views illustrating the camera according to one embodiment of the present invention when the camera photographs a side surface of an object.

Referring to FIG. 13, as the camera 10 photographs a side surface of the object 3 and the object 3 moves at a constant speed, a distance from the camera 10 to a surface of the object 3 to be photographed is linearly increased or decreased as illustrated in FIG. 14. Accordingly, a focus may be easily controlled when the cam is designed in advance to be of a size to push or pull the mirror to adjust a focus according to a distance from the camera 10 to the surface to be photographed which is linearly changed, while an angular velocity at which the rotating motor rotates is maintained at a predetermined speed.

Figure 15:
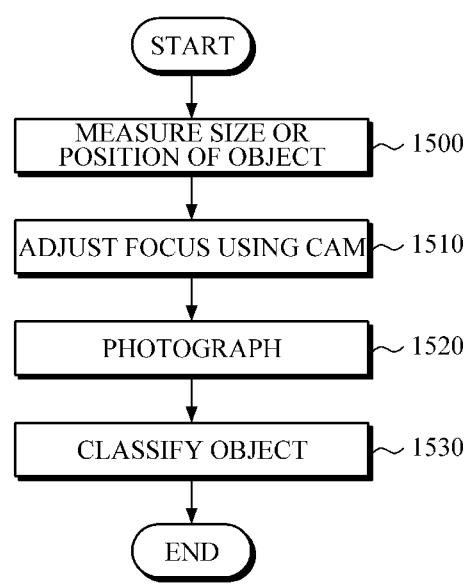
FIG. 15 is a flowchart illustrating an object processing method according to one embodiment of the present invention.

FIG. 15 is a flowchart illustrating an object processing method according to one embodiment of the present invention.

Referring to FIG. 15, the object processing apparatus measures a size or position of a moving object or a distance to the object (1500). Then, a focus of the camera is adjusted using the cam according to the size or the position of the object or the distance to the object which is measured and the object is photographed (1510 and 1520). When the camera adjusts a focal length between the lens and the sensor to adjust the focus, the focus of the camera may be adjusted by moving the mirror connected to the cam forward and backward to adjust the focal length between the lens and the sensor which are fixedly installed. As another example, a focus of the camera may be adjusted by moving the sensor connected to the cam forward and backward or the sensor having the fixed one side end to adjust a focal length between the lens and the sensor without a mirror. To this end, a rotational motion of the cam connected to the rotating motor is used. An incremental value of the cam may be determined such that a distance from the camera to a surface to be photographed when a focus of the camera is adjusted is linearly changed by the incremental value of a distance by which the mirror or sensor is pushed or pulled using the rotating cam and the elastic member.

Then, the camera in which the focus is adjusted photographs the objects (1020) and the object processing apparatus classifies the objects using image data acquired by the camera (1030).

According to the present invention, a camera according to one embodiment can rapidly focus on an object according to a speed of the rapidly moving object. Particularly, since the focus of the camera is adjusted by rotating a cam installed at a rotating motor, the camera can be simply formed in comparison to a case of a linear type linear motor. In addition, in a case in which a position at which a focus is adjusted is adjusted to be proportional to an angular velocity at which the rotating motor rotates, since the focus is adjusted by only rotating the rotating motor at the same angular velocity, the focus can be easily adjusted.

In addition, to adjust the focus, an entirety of a sensor is not moved and a mirror is moved while the sensor is fixed or only one side end of the sensor is moved. Therefore, a focus adjusting method is easy and simple in comparison to a method of moving the entirety of the sensor. A method in which one side end of the mirror or the sensor is fixed eases adjustment of a focal distance between a lens and a sensor in a line scan camera.

In addition, the above-described focus adjustment technology can be applied to an object classification technology and can automatically classify an object. In this case, an operation time can be reduced while accuracy is improved, productivity can be increased, and a structure of an apparatus can be simplified such that an installation space is decreased.

While the present invention has been particularly shown and described with reference to exemplary embodiments thereof, it should be understood by those skilled in the art that various changes in form and details may be made therein without departing from the spirit and scope of embodiments as defined by the appended claims. The exemplary embodiments should be considered in a descriptive sense only and not for purposes of limitation. Therefore, the scope of embodiments is defined not by the detailed description of embodiments but by the appended claims, and all differences within the scope should be construed as being included in the present invention.

What is claimed is:

1. A camera comprising:
   a lens configured to collect and transmit light received from a moving object;
   a mirror configured to reflect the light transmitted via the lens;
   a sensor configured to receive the light reflected by the mirror and convert the light into an image signal;
   a cam configured to move the mirror forward and backward using a rotational motion thereof and adjust a focal length between the lens and the sensor to adjust a focus of the camera; and
   a rotating motor configured to drive the cam,
   wherein the mirror has one side end fixed by a mirror shaft and the other side end connected to the cam, and the other side end of the mirror is moved about the mirror shaft by the cam connected to the rotating motor, and
   wherein a position of the mirror shaft is a point where a position of an object varies minimally when the mirror is moved from the both side ends of the mirror.

2. The camera of claim 1, wherein:
   the sensor includes a line sensor having a line-shaped sensing area; and
   the camera includes a line scan camera.

3. The camera of claim 1, wherein the rotating motor rotates the cam such that the mirror performs a translational motion along an outline of the rotating cam to adjust the focal length between the lens and the sensor.

4. The camera of claim 1, wherein the cam has a shape provided to control the mirror to move at a constant angular velocity of the rotating motor and adjust the focal length between the lens and the sensor when a distance from the camera to a surface of the object to be photographed is linearly increased or decreased.

5. The camera of claim 1, wherein the cam has an incremental value which is determined such that a distance from the camera to a surface to be photographed when a focus of the camera is adjusted is linearly changed by an incremental value of a distance by which the mirror is pushed or pulled using the rotating cam and an elastic member.

6. The camera of claim 1, the cam has a line-symmetrical heart shape or a cross-symmetrical oval shape.

7. The camera of claim 1, wherein the mirror includes:
   a first mirror configured to reflect the light transmitted via the lens; and
   a second mirror configured to reflect the light reflected by the first mirror and transmit the light to the sensor,
   wherein the first mirror and the second mirror are movable.

8. The camera of claim 1, further comprising a joint configured to connect one side end of the mirror with a mirror shaft or connect the other side end of the mirror with the cam,
   wherein the mirror moves about the joint configured to serve as a rotating shaft.

9. The camera of claim 1, further comprising an elastic member configured to prevent the mirror from shaking or escaping from a rotating shaft.

10. A camera comprising:
    a lens configured to collect and transmit light received from a moving object;
    a sensor configured to convert the light transmitted via the lens into an image signal;
    a cam configured to move the sensor forward and backward using a rotational motion thereof to adjust a focal length between the lens and the sensor to adjust a focus of the camera; and
    a rotating motor configured to drive the cam,
    wherein the camera comprises the lens and the sensor without a mirror,
    wherein the sensor is moved by a rotational motion of the cam to adjust a focus of the camera without the mirror, and
    wherein one side end of the sensor is fixed using a sensor shaft, and the opposite side end of the sensor is connected to the cam and moved by the cam.

* * * * *